(12) United States Patent
Rodriguez

(10) Patent No.: US 11,398,125 B2
(45) Date of Patent: Jul. 26, 2022

(54) VENDING MACHINE FOR FOODSTUFFS

(71) Applicant: Frito-Lay North America, Inc., Plano, TX (US)

(72) Inventor: Mauricio Jasso Rodriguez, Apodaca (MX)

(73) Assignee: Frito-Lay North America, Inc., Plano, TX (US)

( * ) Notice: Subject to any disclaimer, the term of this patent is extended or adjusted under 35 U.S.C. 154(b) by 14 days.

(21) Appl. No.: 16/935,743

(22) Filed: Jul. 22, 2020

(65) Prior Publication Data

US 2022/0027877 A1 Jan. 27, 2022

(51) Int. Cl.
| | |
|---|---|
| *G07F 11/72* | (2006.01) |
| *G07F 17/00* | (2006.01) |
| *H05B 1/02* | (2006.01) |
| *H05B 3/68* | (2006.01) |
| *G06Q 20/18* | (2012.01) |

(52) U.S. Cl.
CPC ....... *G07F 17/0078* (2013.01); *H05B 1/0261* (2013.01); *H05B 3/68* (2013.01); *G06Q 20/18* (2013.01)

(58) Field of Classification Search
None
See application file for complete search history.

(56) References Cited

U.S. PATENT DOCUMENTS

| | | | |
|---|---|---|---|
| 3,304,691 A | 2/1967 | Parker | |
| 3,620,341 A | 11/1971 | Gardner | |
| 3,651,752 A * | 3/1972 | Roslonski | H05B 3/0004 99/357 |
| 4,171,066 A * | 10/1979 | Hirose | G07F 17/0078 219/622 |
| 4,398,651 A * | 8/1983 | Kumpfer | G07F 9/02 99/359 |
| 4,482,078 A * | 11/1984 | Reiss | H05B 6/808 221/150 A |
| 4,513,879 A * | 4/1985 | Reiss | H05B 6/808 221/150 A |
| 4,671,425 A * | 6/1987 | Knoll | G07F 11/70 99/357 |
| 4,784,292 A * | 11/1988 | Johndrow | G07F 17/0078 221/101 |

(Continued)

FOREIGN PATENT DOCUMENTS

| | | |
|---|---|---|
| AU | 2008281501 | 2/2009 |
| CN | 203573409 U | 4/2014 |

(Continued)

OTHER PUBLICATIONS

International Search Report and Written Opinion dated Oct. 19, 2021, in PCT/US2021/038653.

*Primary Examiner* — Sunit Pandya
(74) *Attorney, Agent, or Firm* — Barnes & Thornburg LLP; G. Peter Nichols

(57) ABSTRACT

A vending machine configured to dispense foodstuffs includes a plurality of cartridges having a plurality of slots with each slot releasably retaining a foodstuff; a heating section configured to receive at least one foodstuff from at least one of the plurality of slots and to heat the at least one foodstuff; and a dispensing drawer configured to receive the at least one foodstuff passing through the heating section and to permit access to the foodstuff.

11 Claims, 9 Drawing Sheets

(56) References Cited

U.S. PATENT DOCUMENTS

| | | | |
|---|---|---|---|
| 5,480,061 A | 1/1996 | Ellinger | |
| 6,047,855 A * | 4/2000 | Lin | G07F 11/32 |
| | | | 221/150 R |
| 6,059,142 A | 5/2000 | Wittern, Jr. et al. | |
| 6,170,285 B1 * | 1/2001 | Huffman | G07F 11/42 |
| | | | 62/448 |
| 7,357,314 B2 | 4/2008 | Kusakawa | |
| 7,885,726 B2 | 2/2011 | Walker et al. | |
| 9,361,746 B2 | 6/2016 | Otzen | |
| 10,546,445 B2 * | 1/2020 | Lopez | G07F 11/04 |
| 2006/0196883 A1 | 9/2006 | Ward | |
| 2007/0170177 A1 * | 7/2007 | Avendano | H05B 6/129 |
| | | | 219/679 |
| 2016/0376102 A1 * | 12/2016 | Cook, II | G07F 17/0078 |
| | | | 414/281 |
| 2018/0220841 A1 | 8/2018 | Patterson et al. | |
| 2019/0325690 A1 * | 10/2019 | Lopez | G07F 11/16 |
| 2020/0202659 A1 * | 6/2020 | Chen | G05B 15/02 |

FOREIGN PATENT DOCUMENTS

| | | |
|---|---|---|
| CN | 106971458 | 7/2017 |
| DE | 3223804 C1 | 3/1984 |
| DE | 202013100824 U | 5/2013 |
| DE | 102017104191 | 8/2018 |
| EP | 1739615 | 1/2007 |
| EP | 2084995 | 8/2009 |
| FR | 3036781 | 12/2016 |
| JP | 272336 | 3/1998 |
| JP | 2011170586 | 9/2011 |
| KR | 200253263 | 11/2001 |
| NL | 1010579 | 5/2000 |
| RU | 2583355 | 5/2016 |
| WO | 8501821 | 4/1985 |
| WO | 2005020722 | 3/2005 |
| WO | 2012135917 | 10/2012 |
| WO | 2013087277 | 6/2013 |
| WO | 2019204459 | 10/2019 |

* cited by examiner

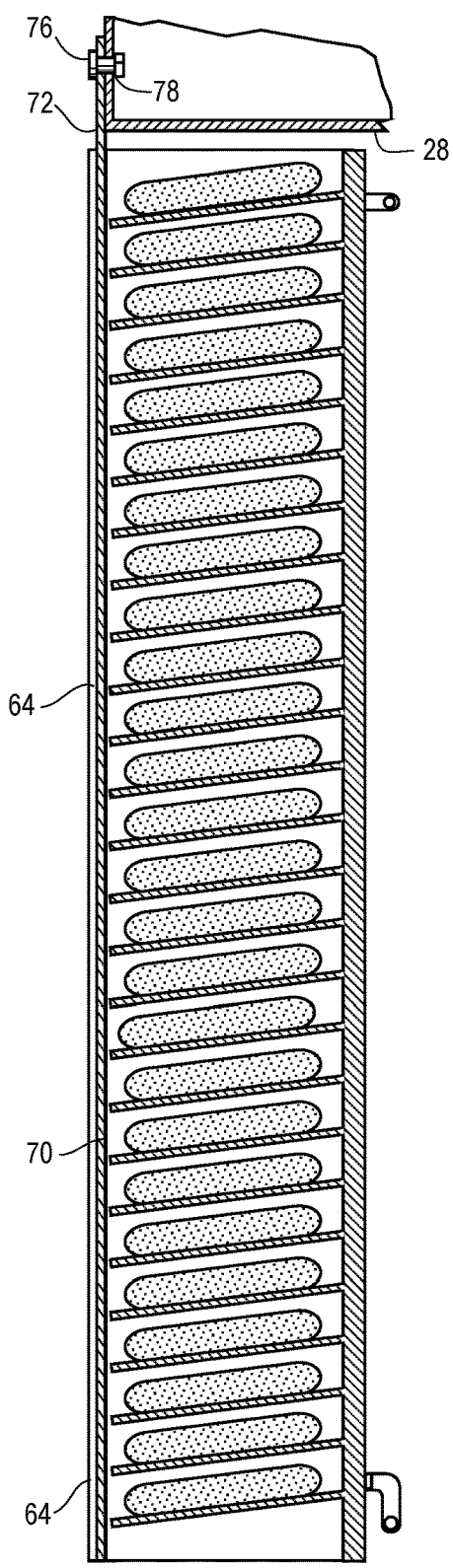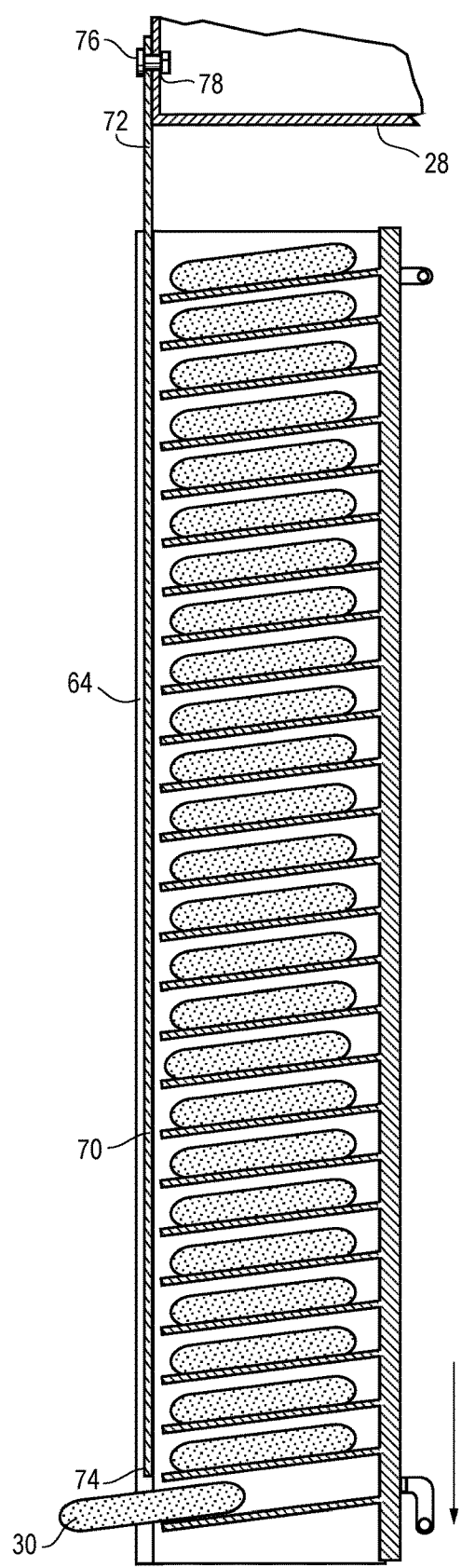

VENDING MACHINE FOR FOODSTUFFS

A vending machine for foodstuffs and a method for dispensing foodstuffs from a vending machine are described. In particular, the described vending machine provides access to foodstuffs that are not packaged and that can be heated or warmed prior to dispensing to the consumer.

BACKGROUND

Vending machines are ubiquitous because they are able to conveniently provide foodstuffs to consumers. Oftentimes, the foodstuffs are packaged and can only be dispensed at ambient temperature because heating packaged foodstuffs might ruin the packaging by melting it. It would be desirable to provide a vending machine capable of dispensing foodstuffs that are not packaged and that can be heated or warmed prior to dispensing to the consumer.

SUMMARY

In one aspect, a vending machine that is configured to dispense foodstuffs is described. The vending machine includes a plurality of removable cartridges with each cartridge having a plurality of slots. Each slot is formed by adjacent spaced apart bases that releasably retain a foodstuff.

A removable cover is provided to retain the foodstuffs within their respective slot. In some aspects, the cartridge a back wall from which two opposing side walls extend and terminate in a lip to slidably receive a cover. The rear of the cartridge is provided with at least one and in some instances two retainers that removably engage complementary and corresponding retaining hooks provided on a moveable carrier. When the cartridge is installed on the moveable carrier in the vending machine, it is generally vertical and each base is angled from the horizontal in a direction from the top of the vending machine toward the bottom of the vending machine. When the cartridge is installed in the vending machine, a top portion of the cover is fixed to an inner frame portion of the machine while each cartridge is moveable in a linear direction (typically in a vertical direction toward the bottom of the vending machine). When the cartridge moves in a particular direction, e.g., in a direction from the top of the vending machine towards the bottom, each successive slot will move past the bottom of the cover so that the foodstuff retained in the particular slot will be dispensed by gravity to a heating section. In this way, only a single foodstuff from is dispensed from a cartridge until the cartridge moves so that an adjacent slot moves past the bottom of the cover.

In some aspects, the foodstuff is not packaged, which allows the foodstuff to be heated prior to dispensing to the consumer. While the foodstuff could conceivably be any type of foodstuff that is capable of retaining its freshness for a period of time from several hours to several days, it is contemplated that the described vending machine will find particular applicability with breakfast-type foodstuffs. Breakfast-type foodstuffs include, but are not limited to sweet breads, breads, pastries, rolls, croissant, English muffin, strudel, donuts, cookies, bagels, bialys, and the like.

The vending machine further includes a heating section configured to receive at least one foodstuff from the at least one of the plurality of slots and to heat the at least one foodstuff. The heating section includes a suitable heater such as an infrared or resistance heater that is operated for a predetermined time to heat or warm any product located in the heating section. In some embodiments, the heating section includes two spaced apart generally parallel resistance heaters that may be oriented in a vertical direction so that the foodstuff(s) when dispensed from any cartridge are located between the heaters. Upon completion of the heating time or upon interruption of heating, the foodstuffs in the heating section may be dispensed to a dispensing drawer by gravity.

As noted, the vending machine includes a dispensing drawer that is configured to receive the at least one foodstuff passing through the heating section and to permit access to the foodstuff by the consumer. In some aspects, the dispensing drawer includes a moveable door, movement of which in one direction provides access to the drawer and may, in some aspects, terminate the heating process.

In some embodiments the moveable door is associated with a floor of the heating section such that when the moveable door is moved, the floor of the heating section moves. As a result, when the moveable door is moved, the floor of the heating section moves allowing the foodstuffs located in the heating section to fall by gravity onto the dispensing drawer. Once the foodstuffs are located on the dispensing drawer, the consumer may take them.

In some embodiments, the vending machine includes a plurality of carrier mechanisms with each carrier mechanism configured to removably receive one of the plurality of cartridges and to move the one of the plurality of cartridges. Each carrier mechanism a first end and a second end. For example, when installed in the vending machine, the first end may be near the top of the machine and the second end may near the bottom of the machine.

Each carrier is movable with respect to base fixed to the interior of the vending machine. The base has a pair of opposed rails that extend outward from the base toward the front of the vending machine. Each carrier has a first side configured to removably receive one of the plurality of cartridges and an opposite, second side, provided with rounded crenellations, i.e., the bottom of the crenellation is rounded.

A rotating cam is positionally fixed and protrudes from the base. The rotating cam has two opposed fingers, such that, when the cam rotates, each finger successively engages a notch in the crenellations which causes the cartridge to advance either from the first end toward the second end or from the second end toward the first end depending on the direction of rotation of the cam.

In operation, when the slots of the cartridges are filled with foodstuffs and the user/consumer makes an appropriate selection, the appropriate cartridge moves downward (from the top to the bottom of the vending machine) such that a slot containing the selected foodstuff moves past the bottom of the cover that the foodstuff is dispensed from the slot to the heating section by gravity.

The vending machine also includes a selection unit for selecting and purchasing one or more foodstuffs. The selection unit includes a payment interface and a product selector interface. The payment interface may be configured to paper currency or coins and may provide change to be returned to the user. In addition to, or alternatively, the payment interface may be configured with a card reader that is at least able to read smart cards, credit cards, debit cards, smartphones and smartphone applications.

The product selector interface may include one or more buttons, indicators, touch screen interfaces, and the like, to be touched, pushed or otherwise operated to make one or more selections of product displayed and contained in the vending machine.

In other aspects, a method of vending foodstuffs from a vending machine is described. The method may include (a) receiving, via the vending machine, compensation for one or more foodstuffs; (b) receiving, via the vending machine, a user input to receive one or more of a selected foodstuff; (c) dispensing, from one or more movable cartridges containing foodstuffs, the one or more selected foodstuff to a heating section, wherein the one or more selected foodstuff may be heated for a predetermined time and thereafter dispensed to a dispensing drawer for access by the user.

The method may also include a dispensing drawer that includes a moveable door such that movement in one direction provides access to the dispensing drawer. In some instances during heating, movement of the moveable door in the one direction terminates the heating process and dispenses the one or more selected foodstuffs to the dispensing drawer.

DESCRIPTION OF THE DRAWINGS

The foregoing aspects and many of the attendant advantages of the present technology will become more readily appreciated by reference to the following Description, when taken in conjunction with the accompanying simplified drawings of exemplary embodiments. The illustrative, schematic drawings, briefly described below, are not to scale, are presented for ease of explanation and do not limit the scope of the inventions recited in the accompanying claims.

FIG. 9 is a cross sectional view of a cartridge with the removable cover installed on the cartridge and with the cartridge filled with foodstuffs to be dispensed.

FIG. 10 is a cross sectional view of a cartridge that has moved so that a slot containing a foodstuff has moved past the bottom of the cover to dispense the foodstuff by gravity to the heating section (not shown).

DESCRIPTION

Figure 1:
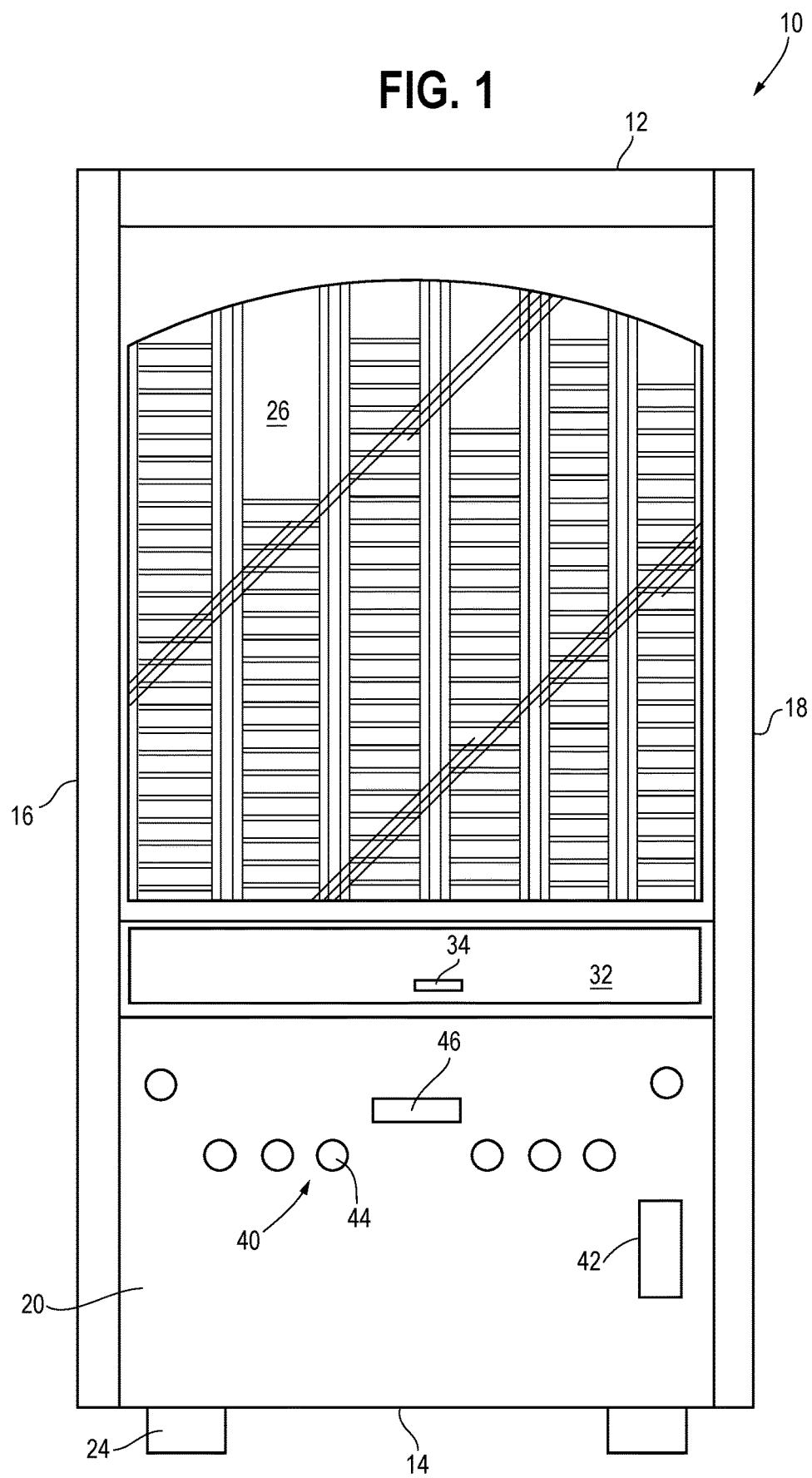
FIG. 1 is front view of a one embodiment of the described vending machine.

Turning now to FIG. 1, a vending machine 10 according to one aspect is shown. The vending machine 10 generally has a top 12, bottom 14, a first side 16, a second side 18, a front 20 and a rear (not shown). The bottom 14 of the vending machine 10 may be provided with feet 24 that rest on a support surface and may be individually adjustable to accommodate variations in the support surface. While only two feet are shown, typically one might expect four feet to be provided.

It will be understood by one of skill in the art that referential directions such as top, bottom, side, front, and back are to be considered with the vending machine 10 arranged in a manner as shown in FIG. 1. Thus, for example, the vending machine 10 may be located in any suitable locale where there is both electricity and a sufficient number of consumers who may wish to purchase the foodstuffs being offered for sale. In this regard, the vending machine 10 may be located in an office, an office cafeteria, a convenience store or the like.

The front 20 of the vending machine 10 is consumer facing, i.e., the front 20 of the vending machine 10 faces the consumer or user so the consumer can see the foodstuffs 30 or product(s) displayed for purchase and so the consumer can interact with the vending machine 10 to purchase and obtain purchased foodstuffs. The front 20 of the vending machine 10 includes a display window 26 through which the consumer can view the various foodstuffs 30 being offered for sale.

As shown in FIG. 1, the vending machine 10 is in a closed position. In this position, the front 20 is closed (and may be locked) to prevent access to the internal portion of the vending machine 10. To that end, the front 20 or at least a portion of the front may be hinged to provide access to the internal portion of the vending machine 10. In one embodiment, the upper front portion (the display window 26 or portion above the moveable door) may be hinged to provide access to the cartridges 50 containing the foodstuffs 30, as will become more evident below, and to other internal aspects or mechanisms.

While much of the internal portion of the vending machine 10 is not shown, it will be understood that the internal portion may contain framing or other structures to support the various mechanisms and apparatus that will be described in more detail below. For example, the internal portion may contain framing to support the carrier 80 or portions of the carrier, the heating section 120 or portions of the heating section, the floor 128 of the heating section, the dispensing drawer 38, and the moveable door 32. The actual structure to position and hold these structures within the internal portion of the vending machine 10 and in relation to other structures is well within the skill of the ordinary artisan constructing such a vending machine.

It will also be appreciated that the internal portion of the vending machine 10 may contain a motor (not shown), the purpose of which will be made clear later, lighting, wiring, and a microprocessor and/or controller (all not shown). The microprocessor and/or controller are configured to control the operation of the vending machine 10. For example, a sensor may sense when a consumer approaches the vending machine 10 and may turn on one or more lights and/or provide one or more sounds in an effort to entice a consumer to interact with the vending machine 10. The microprocessor and/or controller may also sense the consumer's selection of a foodstuff 30, the amount of currency or money deposited with the machine and, as a result, control the operation of the vending machine to dispense one or more foodstuffs 30 to the heating section 120 where the heater may be automatically activated and, when the heating is completed or after a predetermined period of time, the heater may be deactivated. The microprocessor and/or controller may also determine if the amount deposited was greater than the cost of the foodstuff or foodstuffs selected and then return the excess amount to the consumer. Of course, it will be understood that the microprocessor and/or controller may control other functions or operations of the vending machine 10.

The front 20 of the vending machine 10 is provided with a moveable door 32 so that the consumer can gain access to selected foodstuffs that have been dispensed and are located in a dispensing drawer 38. The moveable door 32 may have a handle 34 that when pulled will cause the moveable door 32 to rotate upward to permit access to the dispensed foodstuffs 30.

The front 20 of the vending machine 10 may also be provided with a selection unit 40 that is configured such that the consumer can interact with the vending machine 10 to purchase and select one or more foodstuffs 30 displayed in the vending machine 10. The selection unit 40 includes a payment interface 42 and a product selector interface 44. It is also contemplated that the selection unit 40 may contain one or more status screens 46 (only one of which is shown) that indicates, for example, the amount of money provided to the machine, the number of items that can be selected, other information that might be useful to the consumer when choosing to purchase a foodstuff, the status of the heating which may include an indication of how long the foodstuff(s) 30 has been heated or how much longer the foodstuff(s) 30 will be heated, unless interrupted.

The payment interface 42 may include a currency receiver and a change dispenser. The currency receiver may be configured to accept one or more of paper currency and coins and may provide change (currency or coins) to be returned to the user in the event the cost of the selected foodstuffs is less than the amount deposited. In addition to, or alternatively, the payment interface 42 may be configured with a card reader that is able to read smart cards, credit cards, debit cards, smartphones, smartphone applications, or other non-currency payment apparatus.

The product selector interface 44 may include one or more buttons, indicators, touch screen interfaces, and the like, to be touched, pushed or otherwise operated to enable selection of one or more selections of product displayed and contained in the vending machine.

While not necessary, the front 20 of the vending machine may include a status screen 46 that is capable of providing the status of the heating process which may provide an indication of the amount of time the foodstuffs have been heated, the amount of time remaining until the uninterrupted completion of the heating process, or both. It is also contemplated that the status screen 46 may provide instructions, information relating to the cost of each item and the total cost, the amount of money provided to the machine, or any other information that may be useful.

As noted above, the front 20 of the vending machine also has a display window 26 through which the foodstuffs 30 offered for sale can be viewed. FIG. 1, however, shows the vending machine 10 in an empty state and the cartridges 50 that hold the foodstuffs 30 are empty. As seen in FIG. 1, the depicted vending machine 10 has six cartridges and each cartridge 50 has a plurality of slots 68 each of which is sized to hold a foodstuff 30. While FIG. 1 shows six cartridges, it will be understood that more or less than six cartridges can be provided in the vending machine 10. One of skill will understand that the number of cartridges may be dictated by factors such as the width of each cartridge 50 and the width of the vending machine 10. In this regard, while each of the cartridges 50 shown in FIG. 1 have approximately the same width, it is contemplated that the width of each cartridge 50 may differ to accommodate differing foodstuffs 30.

As noted above, each cartridge 50 has a plurality of slots 68, it being understood that each slot retains a single foodstuff. While the slots depicted in FIG. 1 are shown to have approximately the same height, it is contemplated that the height of the slots in one cartridge 50 may differ from the height of the slots in another cartridge 50 to accommodate differing foodstuffs 30. The number of slots 68 provided in each cartridge 50 is not critical and may be any suitable number to hold the desired number of foodstuffs 30 in a particular cartridge 50. Generally, as may become more evident below, the number of slots 68 provided on each cartridge 50, may be dictated by the length of the cartridge 50, which in turn is dictated by the overall height of the vending machine 10.

Figure 2:
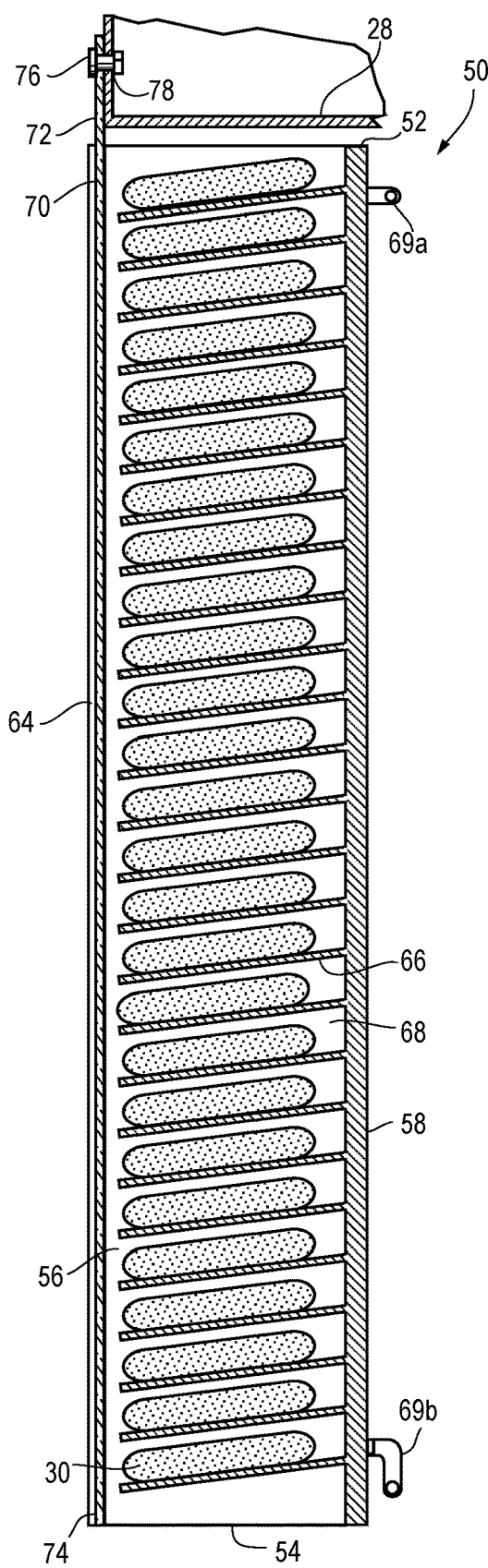
FIG. 2 is a cross-sectional view of a cartridge used to releasably secure foodstuffs for dispensing.

Turning now to FIG. 2, a cross-sectional view of a single cartridge 50 is shown. It is understood that the single cartridge 50 shown in FIG. 2 and described below is representative of each cartridge 50. Each cartridge 50 has a top 52, bottom 54, an open front 56, rear 58, a first side 60 and a second side 62 that extend from the rear 58 toward the open front 56 terminating in an L-shaped lip 64, and a plurality of spaced apart walls 66 that extend from the rear 58 toward the open front 56 to define a plurality of slots 68. Each spaced apart wall 66 is angled slightly from the horizontal (as viewed in FIGS. 1 and 2) from the rear 58 of the cartridge toward the open front 56 so that a foodstuff 30 placed on the wall 66 will slide, by gravity, toward the open front 56 of the cartridge 50.

A cover 70 is slidably and removably received on the front 56 of the cartridge and encloses foodstuffs 30 placed in the cartridge 50. The cover 70 may be slidably received in the area between the front edge of the walls 66 and the L-shaped lips 64. The cover 70 may be slidably removed from the cartridge 50 to permit the cartridge 50 to be filled with foodstuffs 30 and once the cartridge 50 is filled with the desired number of foodstuffs 30, the cover 70 may be slidably replaced onto the cartridge 50 to retain the foodstuffs 30 within the cartridge 50 until dispensed. The cover 70 may be formed of any suitable material, but in some aspects, the cover 70 is transparent so that the foodstuffs 30 located in the slots 68 of the cartridges 50 are visible to the consumer.

Referring to FIGS. 2 and 9, the cover 50 has a top 72 and a bottom 74 such that the cover 70 extends at least the entire length of the cartridge 70 (i.e., from the top 52 of the cartridge to the bottom 54). In this manner, when the cover 50 is installed, each of the slots 68 are covered to retain the foodstuffs 30 located in each slot 68. In some aspects the cover 70 has a length that is longer than the length of the cartridge 50.

As best seen in FIG. 2, the top 72 of the cover 70 is provided with a retaining pin 76, that engages a slot 78 provided in an inner frame portion 28 of the vending machine 10 near the top 12 of the vending machine 10.

Figure 3:
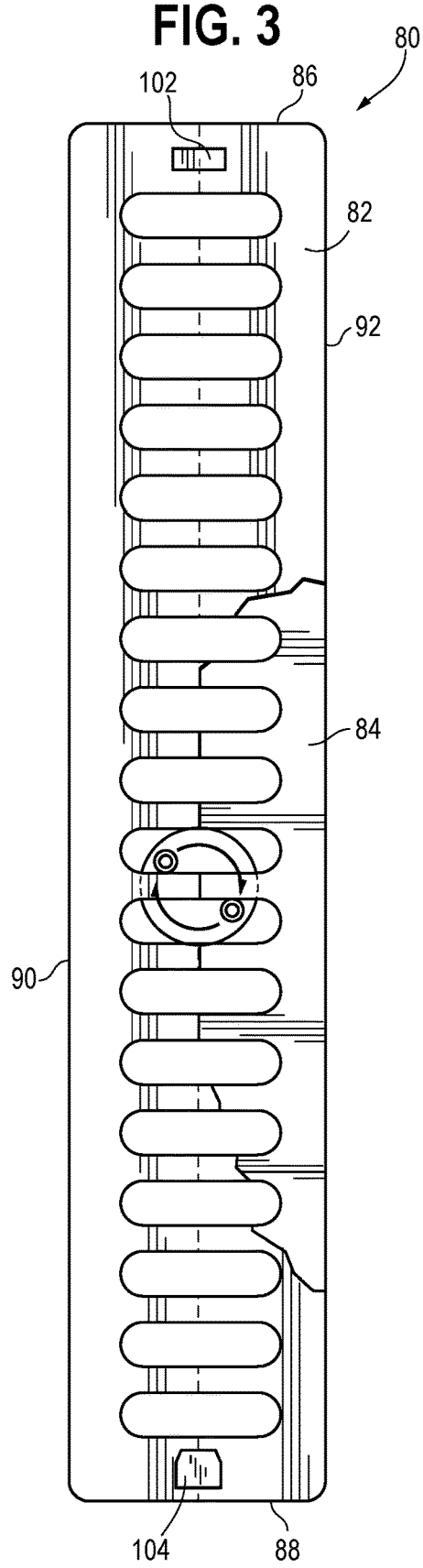
FIG. 3 is a front view of a carrier with a portion away to show the interaction between the rotating cam and the crenellations provided on the rear of the carrier.
Figure 4:
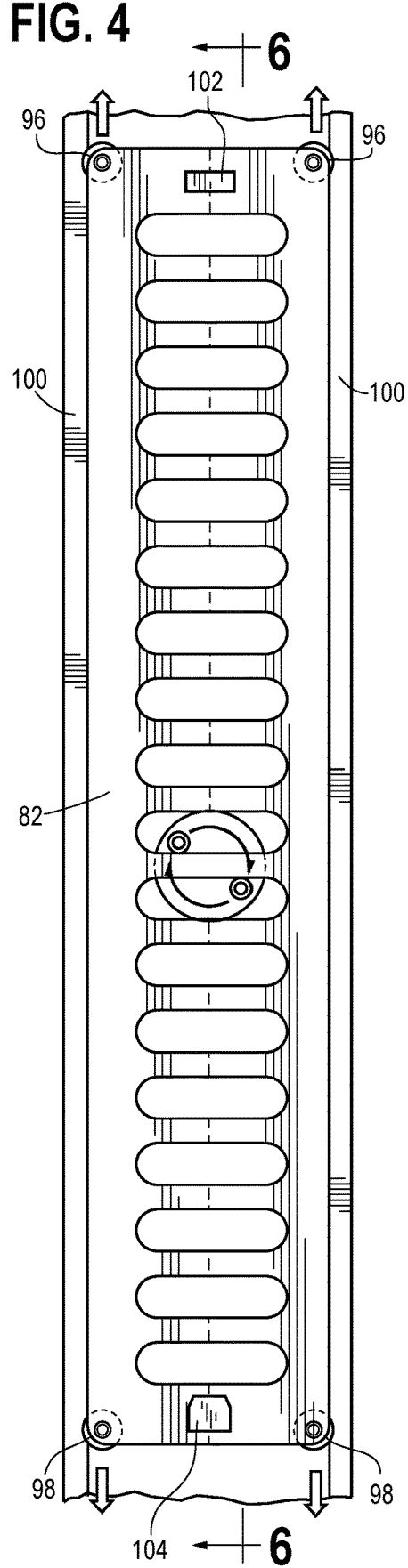
FIG. 4 is a front view of the carrier of FIG. 3 mounted on the rails of the base.
Figure 5:
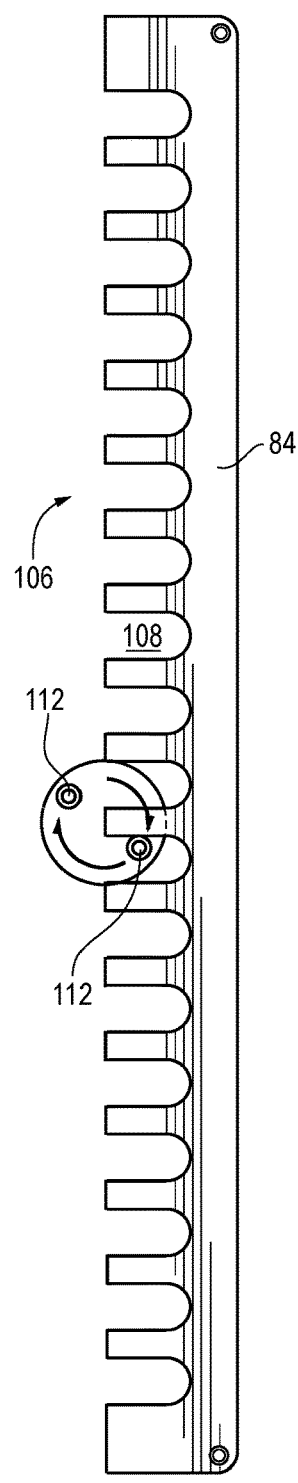
FIG. 5 is the rear of the carrier with only the crenellations being shown and with the cam shown in engagement with one of the crenellations.
Figure 6:
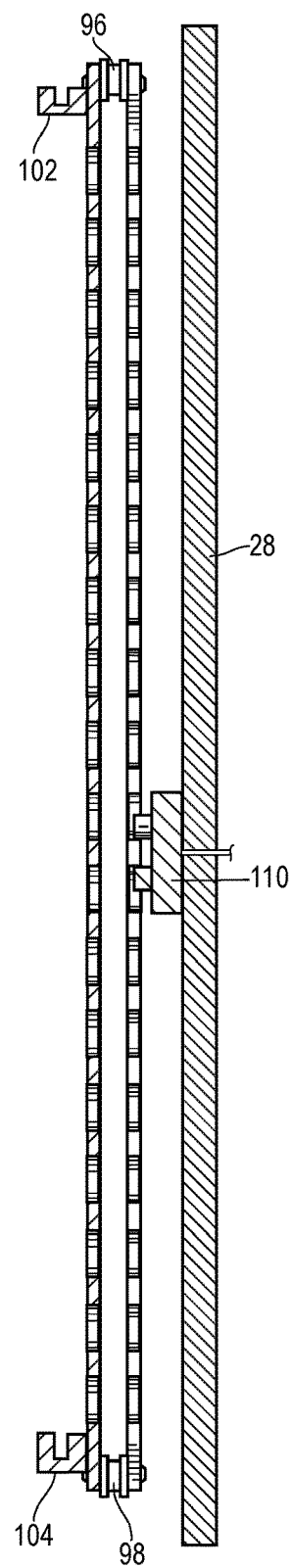
FIG. 6 is a cross-sectional view of the carrier of FIG. 4 showing the cam positionally fixed on the base.

When the retaining pin 76 is engaged with the slot 78, the cover 70 is retained to the inner frame portion 28. However, the cartridge 50 is able to move while the cover 70 is retained, as best seen in FIG. 3.

As the cartridge 50 moves (in a downwardly vertical direction, when referring to FIGS. 1 and 10), the bottommost slot 68 (as viewed in FIGS. 2 and 10) moves past the bottom of the cover 70 such that the foodstuff 30 in that slot 68 slides, by gravity, to the heating section 120.

Figure 11:
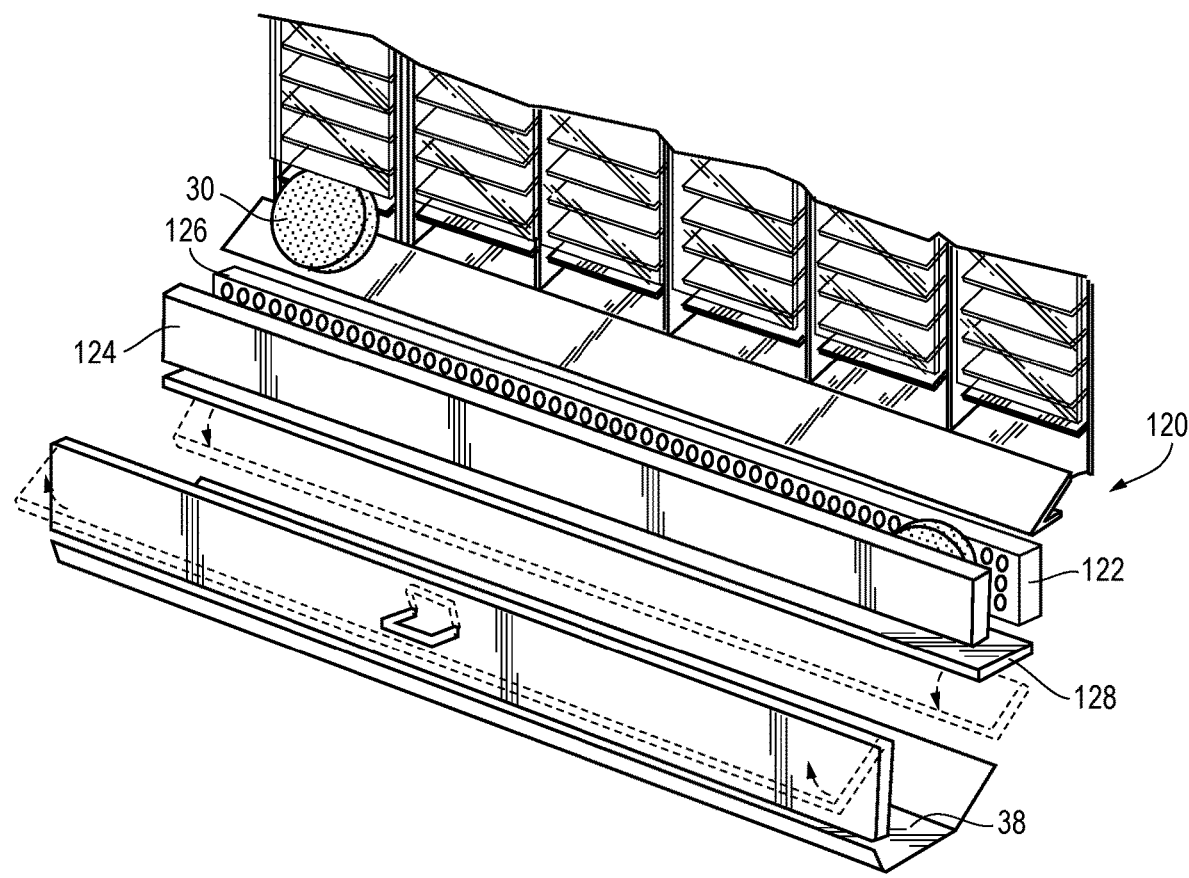
FIG. 11 shows a portion of the top of the carrier and the top of the cartridge and, in particular, the retainer on the carrier and the hook on the cartridge to releasably secure the cartridge to the carrier.
Figure 12:
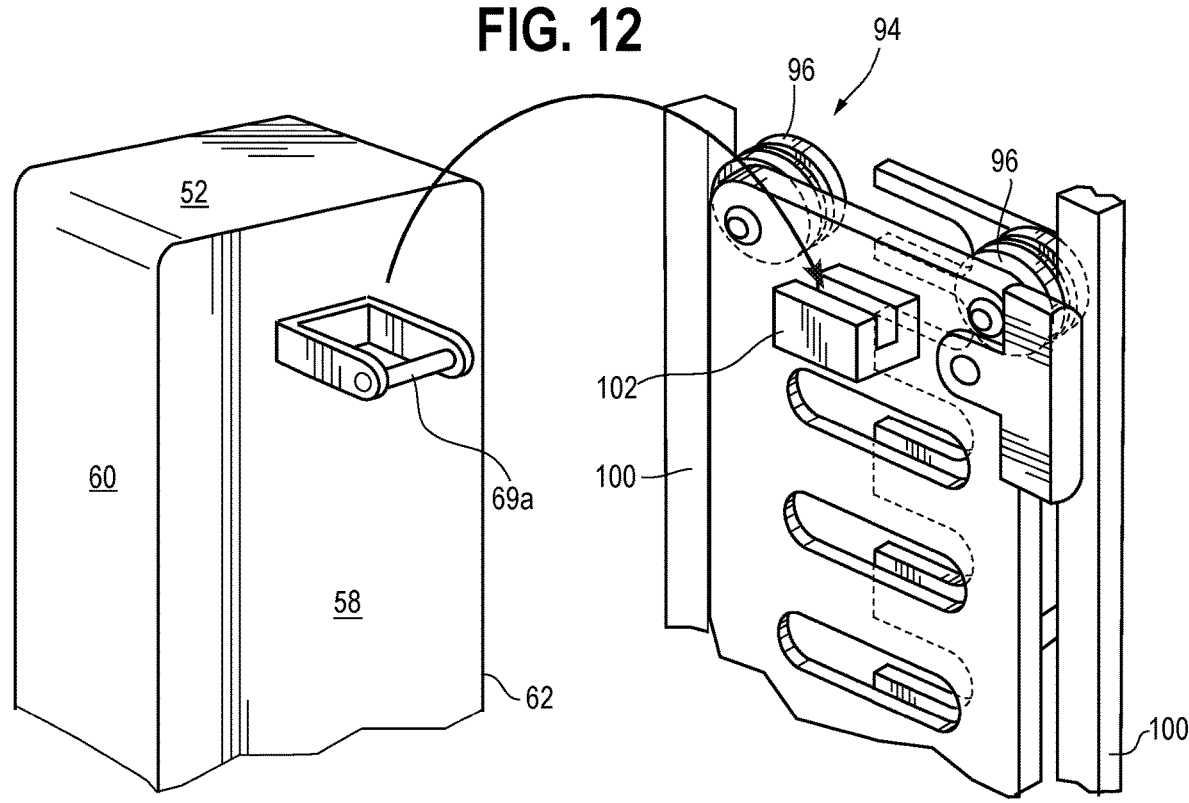
FIG. 12 shows a portion of the bottom of the carrier and the bottom of the cartridge and, in particular, the retainer on the carrier and the hook on the cartridge to releasably secure the cartridge to the carrier.
Figure 13:
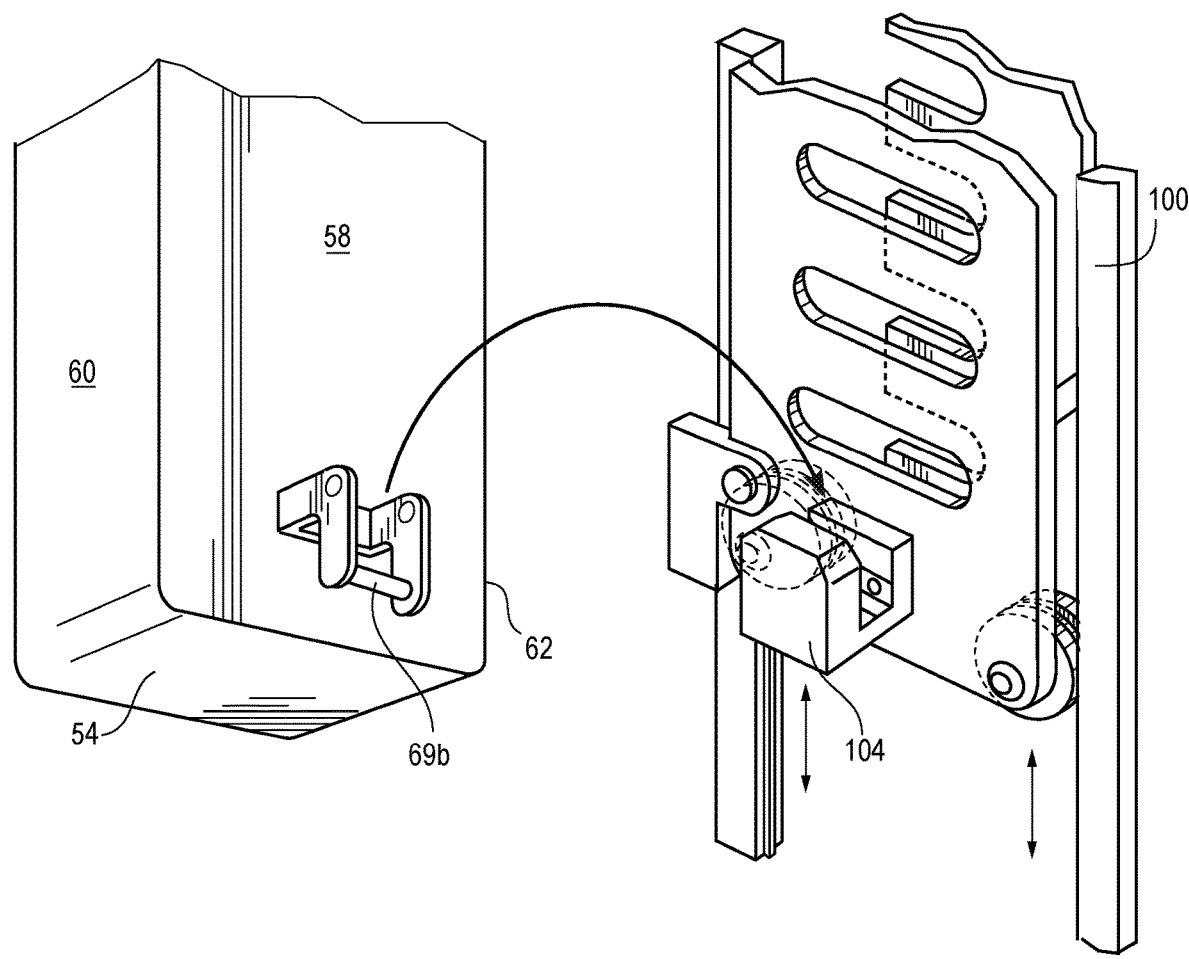
FIG. 13 is a cross sectional view of the cartridge attached to the carrier.

The rear 58 of each cartridge 50 is provided with a first and second retainers 69a, 69b, that engage complementary and corresponding hooks 102, 104 provided on a respective moveable carrier 80 (best seen in FIGS. 11 and 12). In particular, the first retainer 69a is located near the top 52 of the cartridge 50 and the second retainer 69b is located near the bottom 54 of the cartridge 50. Accordingly, each cartridge 50 can be removed from its respective carrier 80 and the slidable cover 70 can be removed to replenish or restock the cartridge 50 with the desired foodstuffs 30. It is contemplated that the first and second retainers 69a, 69b and the corresponding hooks 102, 104 may be located at any suitable location on the cartridge 50 and carrier 80, respectively, so long as the cartridge 50 is removably retained on the carrier 80.

Turning now to FIGS. 3-6, 11, and 12, the moveable carrier 80 will be described. While only a single moveable carrier 80 is shown and described, it is understood that the shown and described carrier 80 is representative of each of the carriers 80. Each carrier 80 has a front 82, a rear 84, a top 86, bottom 88, a first side 90, and a second side 92, and a plurality of rollers 94, 96, 98 that engage rails 100 that are stationary and fixed to the inside of the vending machine 10 (see FIGS. 4, 11 and 12). In one instance, a pair of rollers is provided on each side of the carrier 96 near the top and another pair of rollers is provided each side of the carrier 98 near the bottom. It will appreciated that the rails 100 extend from the top 12 of the vending machine 10 to the bottom 14 or at least a substantial portion. In this way the carrier 80 and thus the cartridge 50 containing the foodstuffs 30, move from an uppermost position (seen in FIG. 1) to a bottommost position where the uppermost slots have traveled past the retained cover.

The front 82 of the carrier 80 is provided with a first hook (or a top hook) 102 located near the top 86 of the carrier 80 to removably receive the first retainer 69a on the cartridge 50 and a second hook (or bottom hook) 104 located near the bottom 88 of the carrier 80 to removably receive the second retainer 69b on the cartridge 50.

The rear 84 of each carrier 80 is provided with crenellations 106 to define a plurality of adjacent slots 108 that receive fingers 112 from a rotatable cam 110 that is fixed to a frame portion 28 in the inside of the vending machine 10. As noted, each cam 110 is stationary and fixed in position but is rotatably driven by a motor (not shown). It will be understood that there is a single motor associated with each cam 110 and carrier 80 so that each of the carriers can be independently moved.

The front of the cam 110 (the front being in relation to the front of the vending machine) has a pair of opposed fingers 112 that, when the cam 110 rotates, each finger 112 successively engages adjacent slots 108 in the crenelated rear 84 of the carrier 80 to move the carrier 80 in the desired direction. For example, when a consumer provides the appropriate payment for one or more foodstuffs 30, and makes one or more appropriate selections, a microcontroller (not shown) controlling the process signals the motor to turn the cam 110 in the appropriate direction so that the carrier 80, and thus the cartridge 70, are moved in a vertically downward direction (as viewed in FIG. 1) to move a slot 68 containing a foodstuff 30 past the bottom 74 of the cover 70, which has been retained in place by the engagement of the retaining pin 76 in the slot 78 so that the foodstuff 30 is exposed (it not being retained by the slidable cover 70) and moves, by gravity, to the heating section 120.

Figure 14:
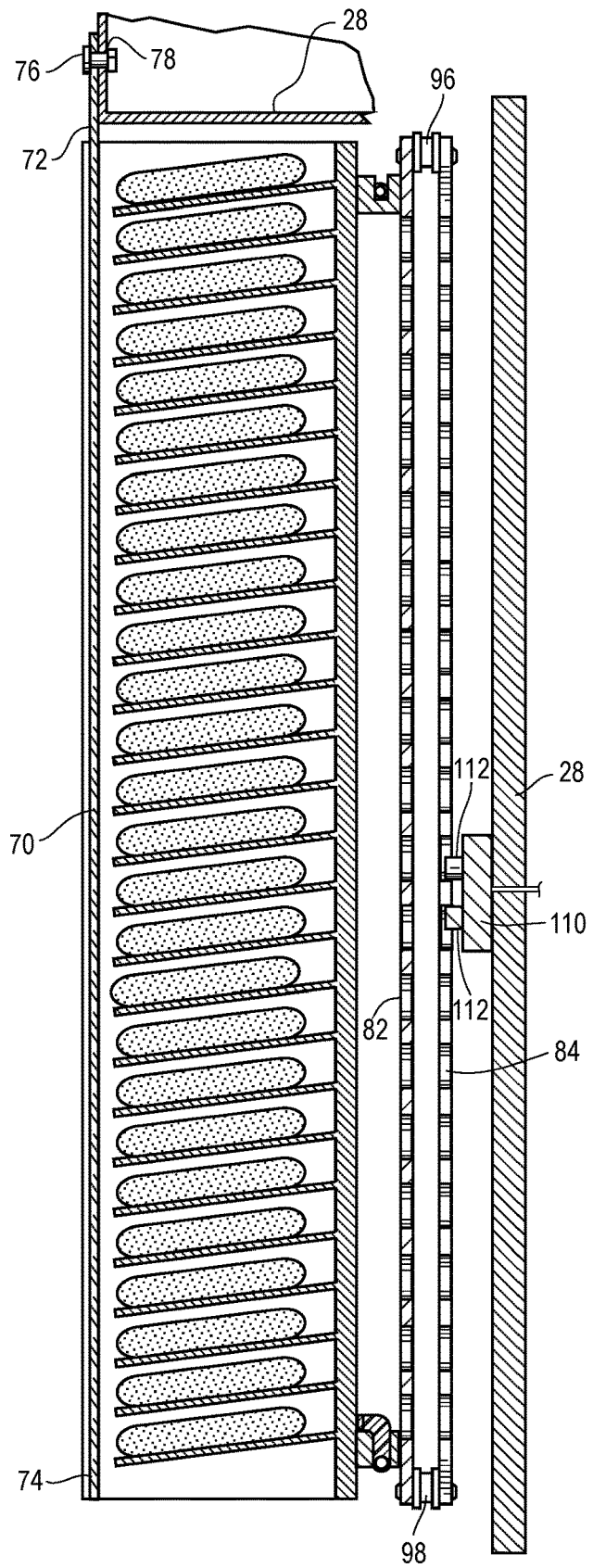
FIG. 14 is a schematic representation of the cartridges dispensing a foodstuff to the heating section and showing the movement of the floor of the heating section in conjunction with simultaneous opening of the door.

Turning now to FIG. 11, a schematic representation of the heating section 120 is shown with cartridges 50 containing foodstuffs 30 and at least one foodstuff 30 being dispensed to the heating section 120. FIG. 14 also shows the floor 128 of the heating section 120 moving in conjunction with the opening of the door 32 so that the foodstuff 30 is dispensed to the dispensing drawer 38 where the foodstuff 30 can be obtained by the consumer. As shown, the heating section 120 includes at least one, and in some instances two spaced apart and opposed heaters 124, 126 between which one or more foodstuffs 30 can be retained by the floor 128 so that the foodstuffs 30 can be heated for a predetermined time unless interrupted.

The heaters 124, 126 can be any suitable type of heater that is capable of quickly generating heat so that a heating process can be completed within the predetermined time. For example, the heaters may be infrared, electrical resistance, induction, heat lamps, etc. In one embodiment, the heaters are electrical resistance heaters.

In some instances, the predetermined time is at least about 5, 10, 15, 20, 25, 30, 35, 40, 45, 50, 55, or seconds. The predetermined may also be less than about 60, 55, 50, 45, 40, 35, 30, 25, 20, 15, 10, or 5 seconds. In other instances, the predetermined time may range from about 5 to about 60 seconds or from about 10 to about 30 seconds, or in some cases about 15 seconds.

The activation of the heaters 124, 126 may be controlled by a microprocessor such that when the appropriate cartridges 50 have completed their respective movements to that the selected foodstuffs 30 are located in the heating section 120, the heaters 124, 126 will be activated and remain activated for a predetermined period of time or unless interrupted. In this regard, in one embodiment, opening of the door 32 triggers a switch (not shown) that terminates the heating process and, as explained below, dispenses the foodstuffs 30 into the dispensing drawer. It will be appreciated that, if the consumer does not wish to have their foodstuffs 30 not heated, they merely need to lift the door 32 so that the foodstuff(s) 30 dispensed from the cartridge(s) 50 fall past the heating section 120 and into the dispensing drawer 38.

In one embodiment, the heaters 124, 126 are oriented vertically. In this embodiment, the floor 128 retains the foodstuffs 30 between the heaters 124, 126 until the consumer moves the door 32 to an open position, which in turn rotates the floor 128 so that the foodstuff(s) 30 falls, by gravity, to the dispensing drawer 38. It will be appreciated that the floor 126 is linked to the door 32 such that movement of the door 32 likewise moves the floor 128.

Figure 7:
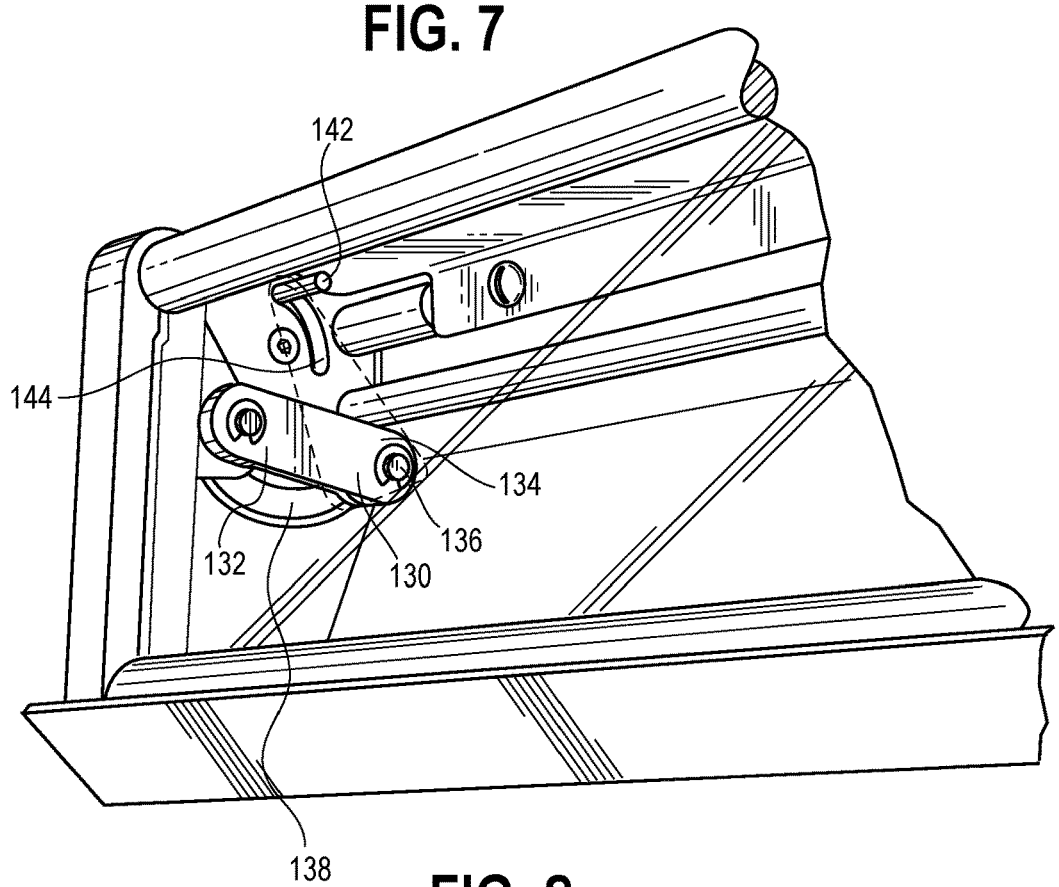
FIG. 7 is a portion of the front of the vending machine and, in particular, shows the moveable door and its association with the floor of the heating section. The moveable door and the floor of the heating section are both in a closed position.
Figure 8:
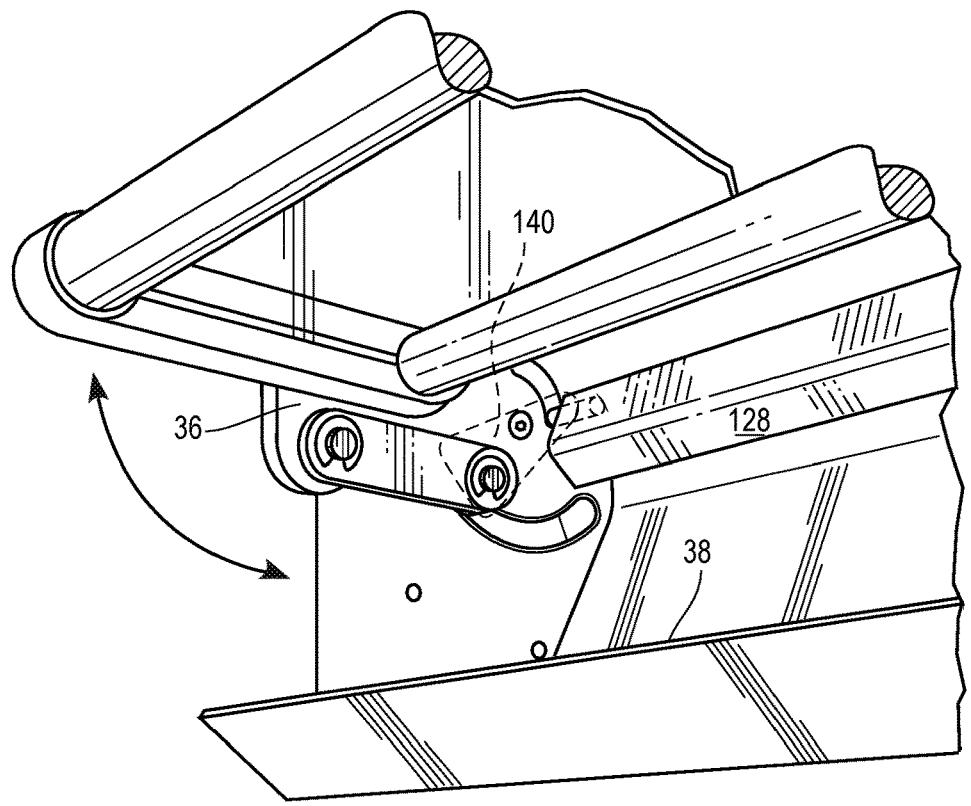
FIG. 8 is a portion of the front of the vending machine and, in particular, shows the moveable door and its association with the floor of the heating section. The moveable door and the floor of the heating section are both in an open position.

Referring to FIGS. 7 and 8, the linkage between the movable door 32 and the floor 126 is shown. The door 32 has a frame from which an ear 36 extends and receives a first end 132 of a linkage bar 130 that is fixed to the ear 36. The second end 134 of the linkage bar 130 has a pin 136 that passes through a first rounded travel groove 138 and is seated on an internal link plate 140. As the door 32 is opened, the pin 136 travels in the rounded travel groove 138 and causes the internal link plate 140 to correspondingly move.

The internal link plate 140 is shown having a triangular shape, but it is contemplated that the link plate 140 may have any suitable shape so long as movement of the door 32 causes a corresponding movement of the heating section floor 128. In that regard, as shown in FIGS. 7 and 8, one corner of the internal link plate 149 has a travelling pin 142 that extends through a second rounded travel groove 144 and contacts the heating section floor 128 such that in one position, the floor 128 is configured to retain foodstuffs 30 in the heating section 120 and in another position, the floor 128 is configured to allow the foodstuffs 30 to fall, by gravity, to the dispensing drawer 38. Accordingly, FIG. 7 shows the moveable door 32 in a closed position and FIG. 8 shows the moveable door 32 in an open position with a foodstuff 30 exiting the heating section 120 to fall to the dispensing drawer 38 where it can be retrieved by the consumer.

Operation of the vending machine 10 will now be described. As a consumer approaches the vending machine 10, the machine may sense the consumer and take one or more actions such as lighting up, making audible sounds and the like. Alternatively, the vending machine 10 may be passive until such time as the consumer interacts with it such as by interacting with the payment interface 42 where the consumer pays for the desired foodstuff or foodstuffs. After paying for the desired number of foodstuffs, the consumer then interacts with the product selector interface 44 to choose the type and number of foodstuffs 30 desired and paid for. In one embodiment, it is contemplated that the vending machine 10 is configured to determine the cost of the selected foodstuffs 30, compare the total cost to the amount of money provided to the vending machine 10 and (i) provide change if the amount provided to the vending machine 10 exceeds the total cost, (ii) inform the consumer that more money is required based on their selection, (iii) terminate the transaction, or (iv) ask the consumer to make a different selection. It is contemplated that a microcontroller or microprocessor will accomplish the above actions.

Once the selection is complete, the microcontroller or microprocessor will activate the appropriate motor or motors to cause the appropriate cam 110 to rotate and thus cause the appropriate carrier 80 and cartridge 50 to move downward toward the bottom 14 of the vending machine 10. As the cartridge 50 moves downward, past the bottom or second end 74 of the cover 70, as seen in FIG. 10, the foodstuff that was retained in the cartridge 50 falls, by gravity, to the heating section 120.

The microcontroller or microprocessor will determine when the desired number of foodstuffs 30 have been dispensed to the heating section 120 and, at that time, the microcontroller or microprocessor will initiate the heating of the foodstuffs for a predetermined amount of time or unless interrupted, as described above. As previously mentioned, the vending machine 10 may have a status screen 46 that can provide information relating to the amount of time the foodstuffs 30 have been heated, the amount of time remaining in the predetermined amount of time, or both. At any time, either after the predetermined amount of time or before, the consumer can move or open the door 32, causing the heating section floor 128 to likewise move to cause the foodstuff(s) 30 to fall by gravity to the dispensing drawer 38 where they can be retrieved by the consumer.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A vending machine having a top spaced from a bottom and being configured to dispense foodstuffs comprising:
   a plurality of cartridges within the vending machine and being moveable in a direction from the top to the bottom of the vending machine, each cartridge having a plurality of slots with each slot releasably retaining a foodstuff;
   a heating section configured to receive by gravity at least one foodstuff from at least one of the plurality of slots and to heat the at least one foodstuff;
   a dispensing drawer configured to receive the at least one foodstuff passing from the heating section and to permit access to the foodstuff.

2. The vending machine of claim 1 wherein each of the plurality of cartridges includes a cover to retain foodstuffs located within each slot.

3. The vending machine of claim 2 wherein each cover is configured to be attached to an inner frame portion of the vending machine.

4. The vending machine of claim 3 wherein a top portion of each cover is configured to be attached to the inner frame portion near the top of the vending machine.

5. The vending machine of claim 4 further comprising a plurality of carrier mechanisms with each carrier mechanism configured to removably receive one of the plurality of cartridges and to move the one of the plurality of cartridges toward the bottom of the vending machine so that a slot moves past a second end of the cover to permit a foodstuff to fall by gravity to the heating section.

6. The vending machine of claim 5 wherein each carrier mechanism comprises:
   a pair of opposed rails extending from a base fixed to the inner portion of the vending machine, each rail having a first end located near the top of the vending machine and a second end extending away from the top of the vending machine;
   a carrier movably associated with the pair of rails and having a first side configured to removably receive one of the plurality of cartridges and a second side provided with crenellations
   a rotating cam protruding from the base at a fixed location and having two opposed fingers, each finger successively engaging a respective notch in the crenellations as the cam rotates to cause the cartridge to advance from the first end toward the second end.

7. The vending machine of claim 1 further comprising a selection unit for selecting and purchasing one or more foodstuffs, the selection unit including a payment interface and a product selector interface.

8. The vending machine of claim 1 wherein the dispensing drawer includes a moveable door, movement of which in one direction provides access to the dispensing drawer.

9. The vending machine of claim 7 wherein movement of the moveable door in the one direction terminates a heating process.

10. The vending machine of claim 1, wherein the heating section includes a floor upon which the foodstuff is retained while being heated, the floor being cooperatively engaged with the dispensing drawer.

11. The vending machine of claim 10 wherein the dispensing drawer includes a moveable door, movement of which in one direction causes the floor to move resulting in movement by gravity of the heated foodstuff to the dispensing drawer.

\* \* \* \* \*